United States Patent
Johns et al.

(10) Patent No.: US 7,539,216 B2
(45) Date of Patent: May 26, 2009

(54) METHOD AND SYSTEM OF DETERMINING LAST HOP DEVICE ADDRESSES

(75) Inventors: Kevin C. Johns, Erie, CO (US); Eric S. Rosenfeld, Superior, CO (US); Jean-François Mulé, Grasse (FR)

(73) Assignee: Cable Television Laboratories, Inc., Louisville, CO (US)

(*) Notice: Subject to any disclaimer, the term of this patent is extended or adjusted under 35 U.S.C. 154(b) by 568 days.

(21) Appl. No.: 11/280,421

(22) Filed: Nov. 16, 2005

(65) Prior Publication Data

US 2007/0110050 A1 May 17, 2007

(51) Int. Cl.
*H04J 3/24* (2006.01)
(52) U.S. Cl. .................. 370/475; 709/203; 709/224; 709/245
(58) Field of Classification Search .......... 370/389, 370/402, 401, 475, 395.31, 254; 709/203, 709/220, 224, 228, 245; 707/3, 100, 103; 726/9

See application file for complete search history.

(56) References Cited

U.S. PATENT DOCUMENTS

| | | | | |
|---|---|---|---|---|
| 6,178,455 | B1* | 1/2001 | Schutte et al. | 709/228 |
| 7,072,341 | B2* | 7/2006 | Xu et al. | 370/392 |
| 2002/0046291 | A1* | 4/2002 | O'Callaghan et al. | 709/238 |
| 2003/0101244 | A1* | 5/2003 | Lockridge et al. | 709/220 |
| 2004/0037242 | A1* | 2/2004 | Shi et al. | 370/329 |
| 2004/0243841 | A1* | 12/2004 | Stumpf et al. | 713/201 |
| 2006/0034259 | A1* | 2/2006 | Matsuda | 370/352 |
| 2006/0056411 | A1* | 3/2006 | Badat et al. | 370/392 |
| 2006/0221863 | A1* | 10/2006 | Ishimoto et al. | 370/254 |
| 2007/0081530 | A1* | 4/2007 | Nomura et al. | 370/389 |

\* cited by examiner

*Primary Examiner*—Hassan Kizou
*Assistant Examiner*—Jeffrey M Rutkowski
(74) *Attorney, Agent, or Firm*—Brooks Kushman P.C.

(57) ABSTRACT

Method and system of determining addressing in a network environment where client devices are serviced by a number of last hop devices. The method and system including determining client device addresses serviced by the last hop devices as a function of last hop device addresses and client address masks associated with each last hop device.

20 Claims, 2 Drawing Sheets

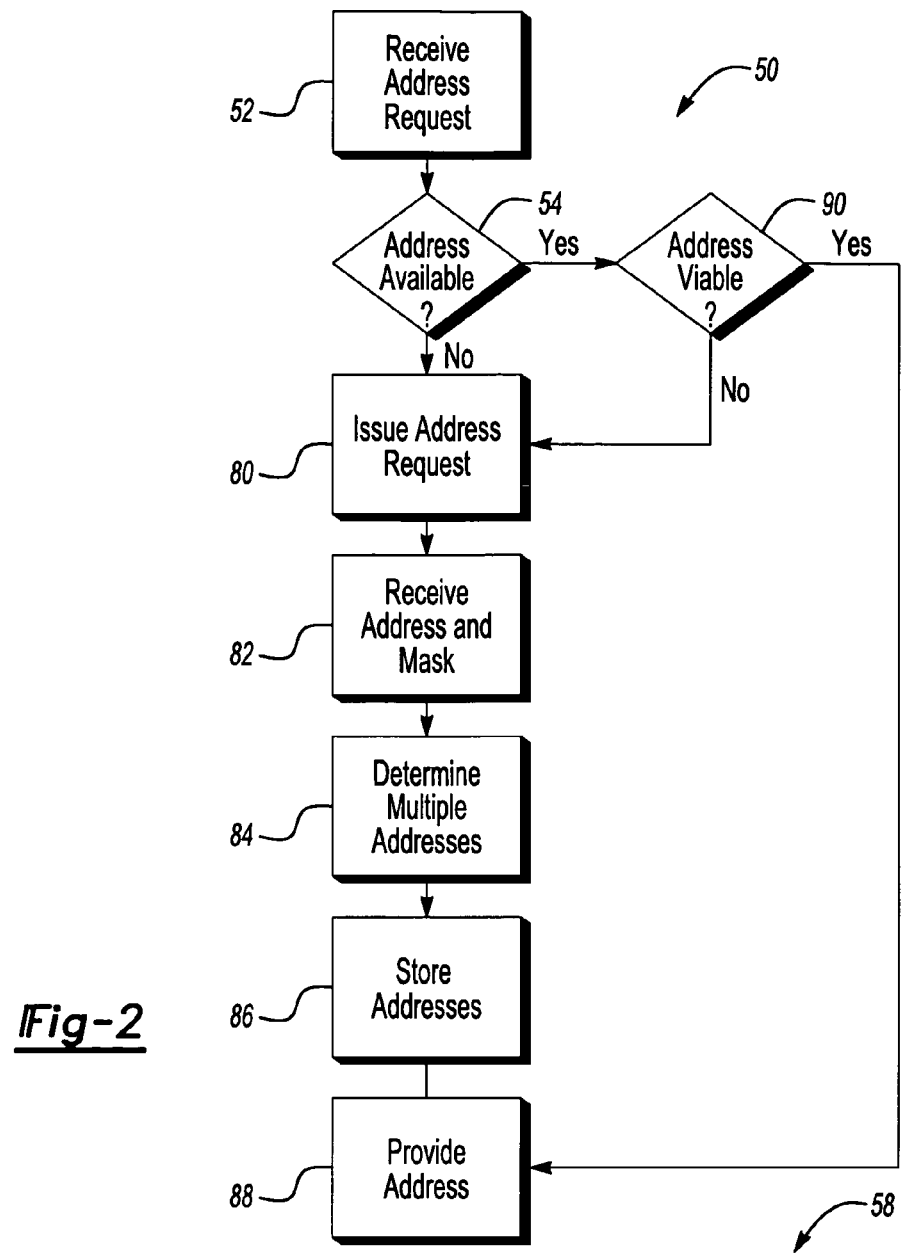

METHOD AND SYSTEM OF DETERMINING LAST HOP DEVICE ADDRESSES

BACKGROUND OF THE INVENTION

1. Field of the Invention

The present invention relates to methods and systems of determining last hop device addresses.

2. Background Art

Last hop device discovery is an important capability in any agile network. Using the Cable Hybrid Fiber Coax (HFC) network as an example, client devices are commonly moved from one last hop device to another and roam from one network attachment point to another. With this agility, it becomes difficult for the network to know where the end client is attached to the network to support such things as QoS authorization and electronic surveillance. A method for discovering the last hop device works as follows:

1. The network element wishing to discover the last hop device does so by issuing an addressing packet with the destination address for the end client in question.

2. The last hope device intercepts the packet (based on some well understood criteria) and responds with its IP address related to the application in question (e.g. electronic surveillance).

3. Upon receipt of the response, the network element now knows the IP address of the last hop device and can address it directly.

The issue with this approach is the requirement to discover the last hop device every time it is desired to contact the last hop device for a given end client. This can be a burdensome in some environments where there is a repeated need to contact the last hop device, such as Voice over Internet Protocol (VoIP) applications where it may desired to perform QoS on the last hop device for each phone call routed therethrough (check line quality, connections, etc.)

One obvious solution to this problem is to cache or otherwise store the last hop device addresses in a database or other feature once they are know, i.e., after each client device has been sent the addressing packet. This process is still problematic as it still requires each client device to be sent the addressing packet, which is relatively inefficient.

SUMMARY OF THE INVENTION

One non-limiting aspect of the present invention relates to determining last hop device addresses for a number of client devices without requiring addressing request to be sent to each client device.

One non-limiting aspect of the present invention relates to a method of determining a last hop device address associated with a last hop device used to communicate signals with one or more client devices, the client devices having client device addresses for facilitating communications therewith. The method may include issuing an address request to at least one of the client device addresses, the address request including instructions for the last hop device associated therewith to reply with the associated last hop address and client device address mask, the client device address mask for use in indicating a range of client device addresses associated therewith, and determining a number of client device addresses associated with the last hop device as a function of the corresponding last hop device address and the range of client device addresses specified with the client device address mask.

The method may include repeating the foregoing process for determining client device addresses associated with another last hop device, and optionally, storing the client device addresses associated with each last hop device in a database.

The method may include receiving an inquiry for the last hop device address associated with one of the client devices included within the database and responding with the requested last hop device address without issuing the address request to the last hop device.

The method may include associating a time-to-live (TTL) value with at least one of the last hop devices included within the database, the TTL value specifying viability of the last hop device addresses with respect to the associated client device address such that the requested last hop device address is provided from the database if the associated TTL value indicates the last hop device address is viable.

The method may include updating the client device addresses associated with the last hop device having an expired TTL value.

The method may include configuring the database as a lookup table to facilitate cross-referencing the client device addresses with the associated last hop device address and corresponding client device address mask.

The method may include including instructions within the address request to prevent the last hop device from replying with the associated client device address mask.

One non-limiting aspect of the present invention relates to a method of collecting last hop device addresses for a number last hop devices used to support communications with client devices. The method may include configuring a database for storing information, creating a client device entry in the database for identifying a number of the client devices, receiving a reply to an address request made to at least one of the client devices identified in the database, the address request including instructions for the last hop device associated therewith to reply with the associated last hop address and client device address mask, the client device address mask indicating a range of client device addresses associated therewith, and populating the client device entries with the last hop device addresses of the last hop devices associated therewith, wherein a number of the client device entries are populated as a function of the corresponding last hop device address and the range of client device addresses specified with the last hop device mask.

The method may include receiving an inquiry for the last hop device address associated with one of the client devices included within the database and determining with the requested last hop device address without requiring reply to the address request if the last hop device address is available for the client device identified in the inquiry.

The method may include associating a time-to-live (TTL) value with at least one of the last hop devices included within the database, the TTL value specifying viability of the last hop device addresses with respect to the associated client device address such that the requested last hop device address is determined from the database if the associated TTL value indicates the last hop device address is viable.

The method may include updating the client device addresses associated with the last hop device having an expired TTL value.

One non-limiting aspect of the present invention relates to a system for managing communication within an electronic network having a number of last hop and client devices, the last hop devices servicing the client devices, the network being agile in that servicing of the client devices is periodically transferred from one last hop device to another. The system may include an addressing element configured to track addressing associated with the client and last hop devices so as to facilitating determining last hop addresses associated with the client devices periodically transferred from one last hop device to another, the addressing element including features for determining a number of client device addresses associated with each last hop device based on last hop addresses and client address masks associated with each last hop device.

The addressing element may include a lookup table for cross-referencing the last hop device addresses with client device addresses associated therewith.

The addressing element may be configured to receive addressing inquiries for the last hop address associated with client addresses, wherein the addressing element is configured to reply to the inquiry with the corresponding last hop device address if the corresponding last hop device address is included within the database.

The addressing element may be configured to issue an address request to the specified client address to determine the last hop device address associated therewith if the corresponding last hop device address is not included within the database.

The address request may prompt the last hop device associated therewith to reply with its last hop address and client address mask, wherein the addressing element determines the last hop device addresses in response thereto.

The addressing element may determine a number of client addresses from the reply and be configured to add the determined client device addresses to the lookup table for the associated last hop device.

The addressing element may associate a time-to-live (TTL) value with at least one of the last hop devices included within the lookup table, the TTL value specifying viability of the last hop device addresses with respect to the associated client device address such that the requested last hop device address is determined from the lookup table if the associated TTL value indicates the last hop device address is viable.

The addressing element may update the client device addresses associated with the last hop device having an expired TTL value.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 2 illustrates a method of determining the last hop device address in accordance with one non-limiting aspect of the present invention; and FIG. 3 illustrates a lookup table kept by the addressing element in accordance with one non-limiting aspect of the present invention.

DETAILED DESCRIPTION OF THE PREFERRED EMBODIMENT(S)

Figure 1:
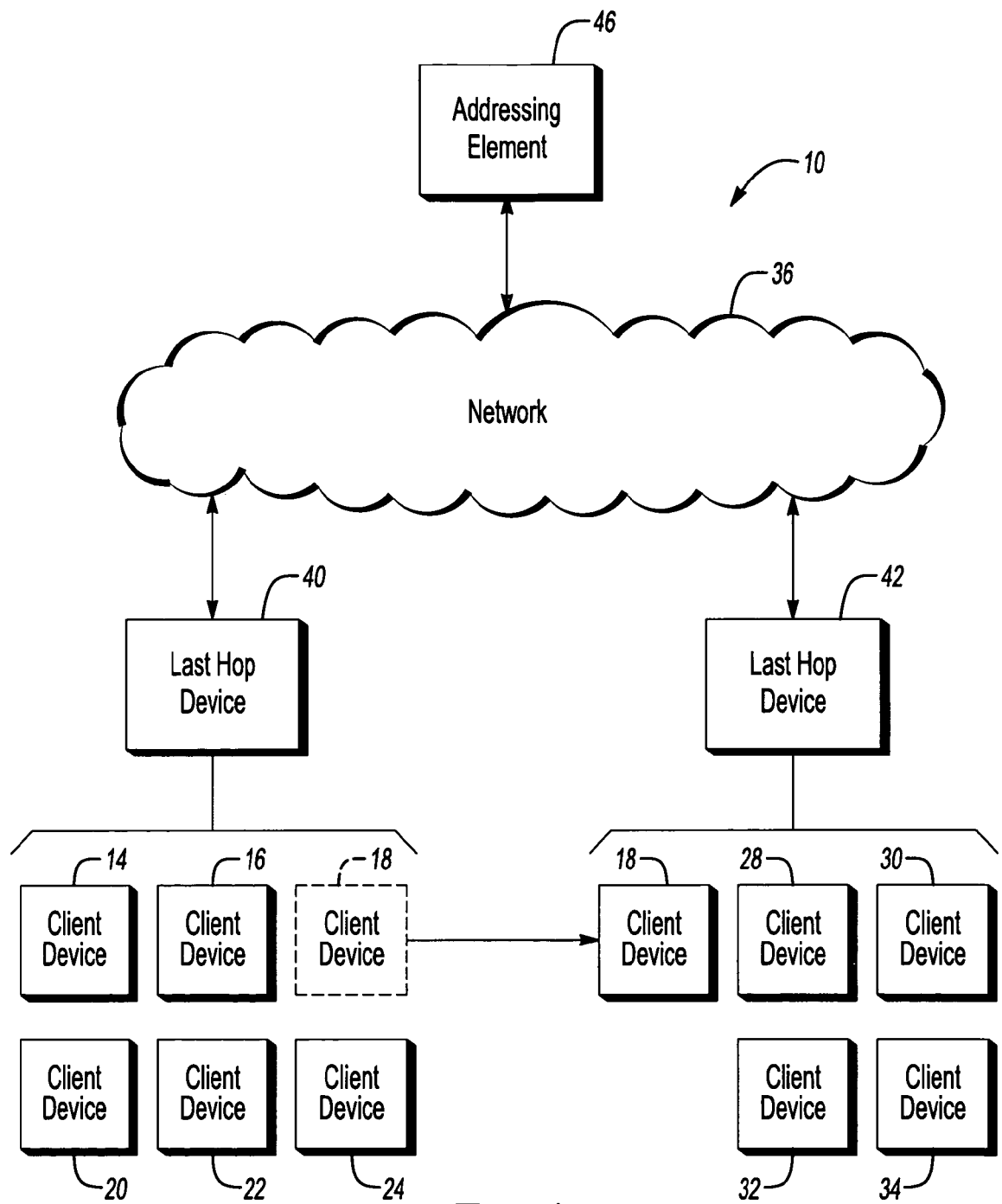
FIG. 1 illustrates an electronic system in accordance with one non-limiting aspect of the present invention.

FIG. 1 illustrates an electronic system 10 in accordance with one non-limiting aspect of the present invention. The system 10 generally includes a number of client devices 14-34 configured to electronically communicate with a network 36. The network 36 may be associated with computer, data, cable, telecommunications, satellite, and other networks where signals are provided to and/or exchanged with the client devices 14-34.

For exemplary purposes, the present invention is described with respect to the system 10 being associated with a cable/satellite/internet television network such that services are provided to the client devices. The services may relate to television programming, video on demand (VOD), pay-per-view, interactive/enhanced television, high speed data, messaging, and any number of other services associated with these networks. Of course, the present invention fully contemplates its application in any number of environments and is not intended to be limited to these or other services.

The client devices 14-34 may include any number of devices or combination of devices having capabilities sufficient to interface the services with the user thereof. For example, the client devices 14-34 may be settop boxes (STBs), cable modems (CMs), outlet digital adapters (ODAs), media termination devices (MTAs), routers, computers, televisions, personal digital assistants (PDAs), phones, VoIP phones, mobile phones, and any number of other devices associated with and/or required to support the services. These types of client devices 14-34 are commonly referred to a customer premise equipment (CPE) or so called 'end client devices' as they are typically located at the customer premises or with the end device associated with interfacing the services with the user thereof.

As one skilled in the are will appreciate, any number of other devices and features may be required to support communications, signaling, and other operations associated with providing the services to the customer premise client devices. These elements are commonly referred to as last hop devices 40-42. Any number of last hop devices 40-42 may be used to support the client devices 14-34.

Because these and other similar features are the last piece of equipment, or other major service provider controlled element, used to control signaling before the customer premises, these features are commonly referred to as last hop devices 40-42. Of course, the characterization of the last hop device 40-42 is dependent on its relation to the client devices 14-34, and therefore, depends on the client device 14-34, which for exemplary purposes of the present invention is selected to be the customer premise equipment. However, the present invention fully contemplates the client devices 14-34 being associated with intermediary or non-customer premises devices such that the corresponding last hop device 40-42 would be last upstream devices associated with supporting the operation thereof.

Some of these last hop devices 40-42 may include routers, hubs, switches, gateways, conditional access routers (CARs), cable modem terminations systems (CMTSs), network provisioning units (NPUs), session boarder controllers, media gateways, media gateway controllers, call management servers, presence servers, SIP routing proxy, SIP registrar servers, PCMM policy servers, bandwidth on demand servers, streaming server caching proxy, gaming servers, media acquisition servers, unified messaging servers, and the like.

Of course, the present invention is not intended to be limited to the foregoing client 14-34 and last hop devices 40-42 and fully contemplates the use of other devices. In particular, the devices need not be standalone functioning elements, as those described above. Rather, the devices may be software applications, computer-readable mediums, and other entities that may be standalone and/or integrated items that require some form of addressing in order to support communications therewith.

As one skilled in the art will appreciate, regardless of the services provided, some form of addressable signaling is required to individually support the client and last hop devices 14-34, 40-42. To facilitate such signaling, an addressing element 46 may be included to track addresses associated with the system 10 and to provide such information to various network features as needed.

Optionally, before each client and last hop device 14-34, 40-42 is added to the system 10 and/or in some other manner, such as in response to a system upgrade or reinstall, the addressing element 46 may assign an address thereto, such as an IP address. This address becomes associated with the device 14-34, 40-42 to track its movement within the system 10 and to facilitate communications therewith. For the purposes of the present invention, these addresses are hereinafter referred to as client and last hop device addresses.

One problem with supporting the system 10 relates to the client devices 14-34 or other network nodes migrating between last hop devices 40-42. Commonly, if capacity becomes to great, a client device 18 may be migrated from one last hop device 40 to another last hop device 42, as shown in FIG. 1. If the migrated client device 18 relates to Voice over Internet Protocol (VoIP) phone, for example, then the routing of calls to and from the migrated client device 18 is also migrated from one CMTS (last hop device) to another.

The agility of such a network therefore requires an ability to track the last hop device address of the last hop device 40-42 supporting the migrated client device, such as to support quality of service (QoS), surveillance, and other operations associated therewith. In more detail, for each VoIP phone call, a VoIP server (not shown) may desire to perform a QoS analysis on the last hop device 40-42 servicing the phone call, such as to determine line quality, connection capabilities, and other operations. In order to do this, the server must communication with or otherwise contact the last hop device(s) 40-42 supporting the call, which requires the server to know the corresponding last hop device address(es) or other identifier sufficient to facilitate communications with the last hop device(s).

FIG. 2 illustrates a flowchart of a 50 method of determining the last hop device address in accordance with one non-limiting aspect of the present invention. The method may be executed by the addressing element 46 according to instructions included within a computer-readable medium and/or through some other executing application or program. The method may be used for any number of addressing operations and is not intended to be limited to determining addresses of last hop devices 40-42 used to support customer premises equipment, as the client devices 14-34 may be associated with non-customer premise equipment.

Block 52 relates to receiving an addressing inquiry. The addressing inquiry may be received by the addressing element 46 from another network element (not shown) desiring to contact a last hop device 40-42 associated with a particular client device 14-34, such as to perform the above-described QoS or surveillance. Optionally, the addressing inquiry may identity the client device 14-34 for which the last hop device address is requested, such as by including the client device address within the addressing inquiry.

Block 54 relates to determining whether a last hop device address is available for the identified client device. The addressing element 46 may include a memory (not show) or other database for associating the client devices 14-34 with the last hop device 40-42 used to support communications therewith. The availability of the last hop device address may be determined from this information. For example, FIG. 3 illustrates a lookup table 58 kept by the addressing element 46 in accordance with one non-limiting aspect of the present invention. The lookup table 58 may include a number of client device entries 62-76 for cross-referencing the client device addresses with the last hop device address of the last hop device 40-42 associated therewith.

Block 80 relates to issuing an address request if no last hop device address is available for the client device 14-34. The address request may be issued by the addressing element 46 and addressed to the client device address of the desired client device 14-34. The address request may include instructions for prompting or otherwise instructing the last hop device 40-42 servicing the addressed client device 14-34 to reply with its address. This may be accomplished through standard instructions and protocols and configured according to the particular operating system and capabilities of the last hop device 40-42.

The instructions may further request the last hop device 40-42 to reply with a client device address mask identifier associated with the client device 14-34. The client device address mask identifier may be used to identify a range of client device addresses supported by the corresponding last hop device 40-42. For example, IP addressing may be use to identify the client and last hop devices 14-34, 40-42. Such IP addressing may include a subnet mask identifier that can be used to identify a subnet (or range of addresses) to which an IP address belongs by performing a bitwise AND operation on the subnet address mask and the IP address, i.e., the client device address mask identifier operates in conjunction with the nomenclature of the device addressing to facilitate determine addresses supported by the last hop device 40-42.

Requesting the client device address mask is an optionally feature that may be included within the address request when it is desirable to determine multiple client devices 14-34 associated with the last hop device 40-42 servicing the addressed client device address, the determination of which is described below in more detail. In some cases, however, the requesting server may only be interested in a single device and not all other devices associated with the same network. In this case, the server may issue the request without requesting the client addressing mask.

Block 82 relates to the last hop device 40-42 replying to the addressing element 46 with its last hop device address, and optionally, its client device address mask identifier associated with the device address. Block 84 relates to determining multiple client device addresses associated with the last hop device 40-42 as a function of the last hop device address and the range of client device addresses specified in the corresponding client device address mask identifier. Multiple client device addresses may be determined from a single last hop device address and client device address mask identifier.

In more detail, multiple client device addresses may be determined from each last hop device address and client device address mask identifier such that, for each reply to an address request, the addressing element 46 is able to determine multiple client device addresses for the corresponding last hop device 40-42, thereby eliminating the need to individually contact each client device 14-34 in order to obtain the last hop device address associated therewith. In this manner, subsequent address inquiries may be responded to without necessarily contacting the last hop device 40-42 associated therewith.

Block 86 relates to storing the multiple addresses within the table 58. This includes updating the association between the last hop device addresses and client address for each client entry 62-76 associated with the client addresses determined in Block 84. Block 88 relates to providing the requested addressing information to the element issuing the addressing inquiry to the addressing element 46. Blocks 80-86 may then be repeated as desired to populate the table 58 for additional last hop devices 40-42 such that the table 58 may include multiple last hop devices 40-42 and their associated client device address mask identifier and supported client device address.

Returning to Block 54, if the table already includes the desired last hop device address, Block 90 relates to determining whether the last hop device address is viable. For example, given the agility of the network, it may be desirable to assign a time-to-live (TTL) value to one or more of the device entries. The TTL value may specify whether the stored address should be considered accurate. For example, the TTL value may specify that addresses should only be considered to be accurate for a limited period of time, such as days, months, years, etc., and/or that the addresses should be updated upon occurrence of some event, such as a system upgrade, power shortage, etc.

Block 80 is returned to if the address is determined to be unviable and Blocks 80-88 are repeated, as described above, to update the addressing information. This updating not only updates the addressing information for the specified client device 14-34, but also the other client devices 14-34 associated with the corresponding last hop device 40-42. As such, the present invention is able to update the addressing information without individually contact the each client device.

Block 88 is returned to if the addressing information is viable and the addressing information is provided to the entity initiating the address inquiry. Advantageously, the addressing information may be provided without issuing the addressing request for the viable addresses already included within the table 58. This allows the present invention to rapidly and efficient responses to address inquires without necessarily issuing addressing requests each time an address inquiry is received.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of determining a last hop device address associated with a last hop device used to communicate signals with one or more client devices, the client devices having client device addresses for facilitating communications therewith, the method comprising:
    issuing an address request to at least one of the client device addresses, the address request including instructions for the last hop device associated therewith to reply with the associated last hop address and client device address mask, the client device address mask for use in indicating a range of client device addresses associated therewith;
    determining a number of client device addresses associated with the last hop device as a function of the corresponding last hop device address and the range of client device addresses specified with the client device address mask;
    determining client device addresses associated with another last hop device based on another address request;
    storing the client device addresses associated with each last hop device in a database; and
    configuring the database as a lookup table to facilitate cross-referencing the client device addresses with the associated last hop device address and corresponding client device address mask.

2. The method of claim 1 further comprising receiving an inquiry for the last hop device address associated with one of the client devices included within the database and responding with the requested last hop device address without issuing the address request to the last hop device.

3. The method of claim 2 further comprising associating a time-to-live (TTL) value with at least one of the last hop devices included within the database, the TTL value specifying viability of the last hop device addresses with respect to the associated client device address such that the requested last hop device address is provided from the database if the associated TTL value indicates the last hop device address is viable.

4. The method of claim 3 further comprising updating the client device addresses associated with the last hop device having an expired TTL value, the client device addresses being updated according to the method of claim 1.

5. The method of claim 1 wherein the last hop devices are gateways.

6. The method of claim 1 wherein the last hop devices are a last network connection made to the client devices.

7. A method of collecting last hop device addresses for a number last hop devices used to support communications with client devices, the method comprising:
    configuring a database for storing information;
    creating client device entries in the database for identifying a number of the client devices;
    receiving a reply to an address request made to at least one of the client devices identified in the database, the address request including instructions for the last hop device associated therewith to reply with the associated last hop address and client device address mask, the client device address mask indicating a range of client device addresses associated therewith; and
    populating the client device entries with the last hop device addresses, client addresses, and client device address mask of the last hop devices associated therewith, wherein a number of the client device entries are populated from the reply as a function of the corresponding last hop device address and the range of client device addresses specified with the client device address mask.

8. The method of claim 7 further comprising receiving an inquiry for the last hop device address associated with one of the client devices included within the database and determining with the requested last hop device address without requiring reply to the address request if the last hop device address is available for the client device identified in the inquiry.

9. The method of claim 8 further comprising associating a time-to-live (TTL) value with at least one of the last hop devices included within the database, the TTL value specifying viability of the last hop device addresses with respect to the associated client device address such that the requested last hop device address is determined from the database if the associated TTL value indicates the last hop device address is viable.

10. The method of claim 9 further comprising updating the client device addresses associated with the last hop device having an expired TTL value.

11. The method of claim 7 further comprising, in response to receiving a request for a last hop address, matching the client device address specified in the request against the client device addresses specified in the client device entries, and providing the last hop address populated in the corresponding client device entry if the client device addresses match, otherwise determining the last hop address from a response to an address request issued to the client device address specified in the request.

12. The method of claim 11 further comprising including instructions in the address request for the responding last hop device to specify the associated client device address mask.

13. The method of claim 12 further comprising populating additional client device entries for the client addresses specified in client device address mask associated with the responding last hop device.

14. The method of claim 13 further comprising populating the additional client device entries without issuing separate address requests to the client devices associated with the additional entries.

15. The method of claim 7 wherein the last hop devices are gateways.

16. The method of claim 7 wherein the last hop devices are a last network connection made to the client devices.

17. A system for managing communication within an electronic network having a number of last hop and client devices, the last hop devices servicing the client devices, the network being agile in that servicing of the client devices is periodically transferred from one last hop device to another, the system comprising:
 an addressing element configured to track addressing associated with the client and last hop devices so as to facilitating determining last hop addresses associated with the client devices periodically transferred from one last hop device to another, the addressing element including features for determining a number of client device addresses associated with each last hop device based on last hop addresses and client address masks associated with each last hop device;
 wherein the addressing element includes a lookup table for cross-referencing the last hop device addresses with client device addresses associated therewith;
 wherein the addressing element is configured to receive addressing inquiries for the last hop address associated with client addresses, wherein the addressing element is configured to reply to the inquiry with the corresponding last hop device address if the corresponding last hop device address is included within the database;
 wherein the addressing element associates a time-to-live (TTL) value with at least one of the last hop devices included within the lookup table, the TTL value specifying viability of the last hop device addresses with respect to the associated client device address such that the requested last hop device address is determined from the lookup table if the associated TTL value indicates the last hop device address is viable; and
 wherein the addressing element updates the client device addresses associated with the last hop device having an expired TTL value.

18. The system of claim 17 wherein the addressing element is configured to issue an address request to the specified client address to determine the last hop device address associated therewith if the corresponding last hop device address is not included within the database.

19. The system of claim 18 wherein the address request prompts the last hop device associated therewith to reply with its last hop address and client address mask, wherein the addressing element determines the last hop device addresses in response thereto.

20. The system of claim 19 wherein the addressing element further determines a number of client addresses from the reply and adds the determined client device addresses to the lookup table for the associated last hop device.

* * * * *